United States Patent
Giraud

[11] 4,272,758
[45] Jun. 9, 1981

[54] ARRANGEMENT FOR PROVIDING A POWER SUPPLY AND TRANSMITTING ELECTRICAL SIGNS BETWEEN TWO DEVICES USING A SMALL NUMBER OF CONTACTS

[75] Inventor: Georges Giraud, Le Vésinet, France

[73] Assignee: Compagnie Internationale pour l'Informatique CII Honeywell Bull (Societe Anonyme), Paris, France

[21] Appl. No.: 941,674

[22] Filed: Sep. 12, 1978

[30] Foreign Application Priority Data

Sep. 16, 1977 [FR] France .................................. 77 28048

[51] Int. Cl.³ .......................... H04B 3/60; H04Q 1/38
[52] U.S. Cl. ............................ 340/310 A; 340/149 A; 340/167 A; 340/172; 340/310 R; 178/66.1
[58] Field of Search ........ 340/310 A, 310 R, 310 CP, 340/149 A, 167 A, 172, 169; 307/3; 323/8; 178/58 R, 58 A, 60, 66.1; 370/9, 24; 375/22, 24, 25, 36, 41, 37; 455/54, 95, 108, 127

[56] References Cited

U.S. PATENT DOCUMENTS

| | | | |
|---|---|---|---|
| 3,488,517 | 1/1970 | Cowan et al. .................... | 340/310 A |
| 3,959,772 | 5/1976 | Wakasa et al. .................... | 340/167 A |
| 4,007,458 | 2/1977 | Hollabaugh ...................... | 340/310 A |
| 4,016,480 | 4/1977 | Hofmann ......................... | 340/310 A |
| 4,163,210 | 7/1979 | Giraud ............................. | 235/302 |
| 4,217,572 | 8/1980 | Giraud ............................. | 340/167 A |

*Primary Examiner*—James J. Groody
*Attorney, Agent, or Firm*—Kerkam, Stowell, Kondracki & Clarke

[57] ABSTRACT

An arrangement for both exchanging data between first and second devices and supplying power from the first to the second device, all through only two interconnecting lines or contacts. Data transmission from the first to second device is accomplished by a modulated current generator in the first device connected to the two liens. Data transmission from the second to the first device is accomplished by a modulator which shunts the two lines while the current generator supplies a current, thus varying the voltage across the line in a manner which may be sensed by a comparator in the first device. In order to supply power to the second device, the second device includes a network having at least one unidirectional conduction member, such as a diode, connected to the two lines.

20 Claims, 10 Drawing Figures

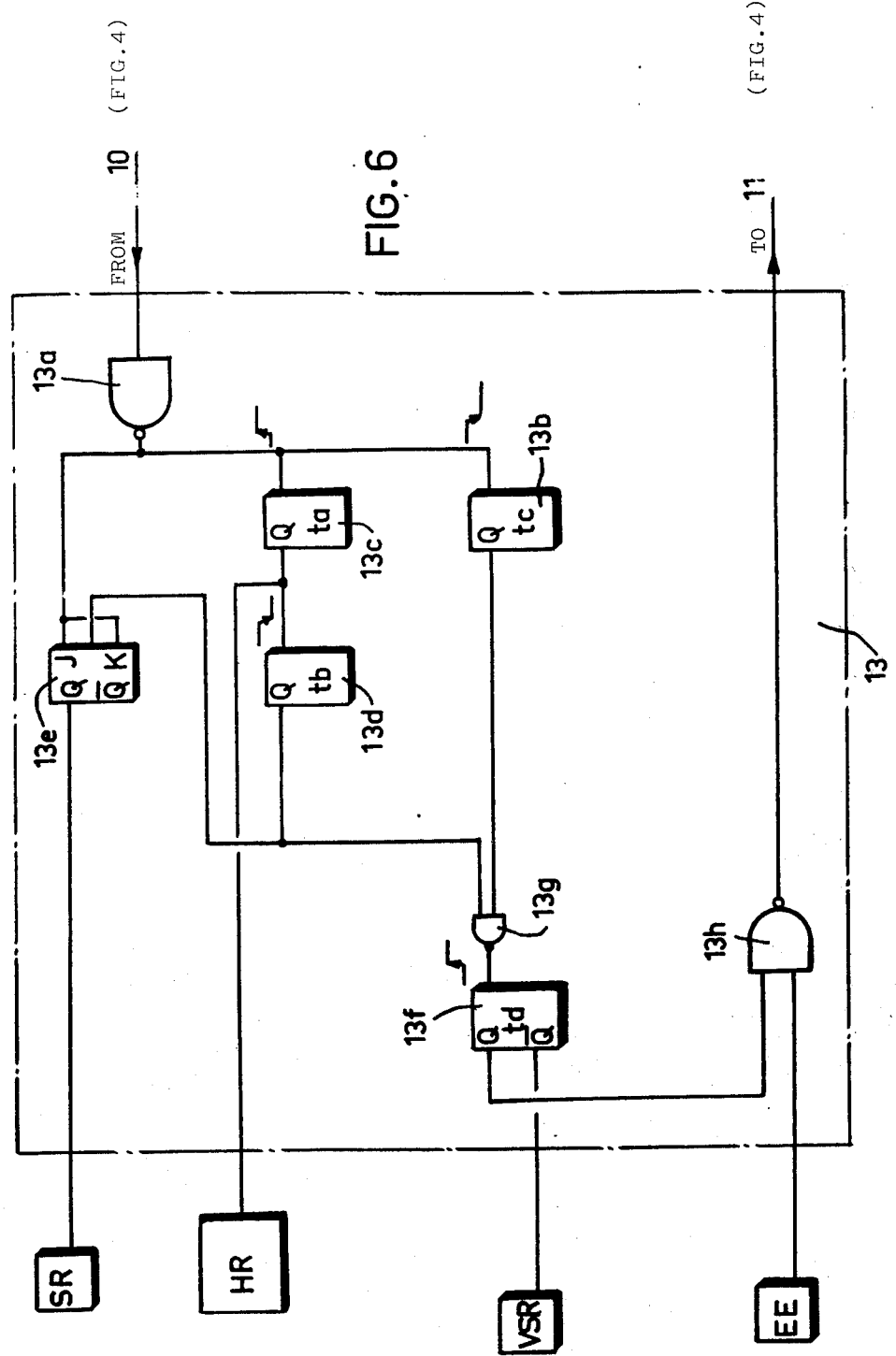

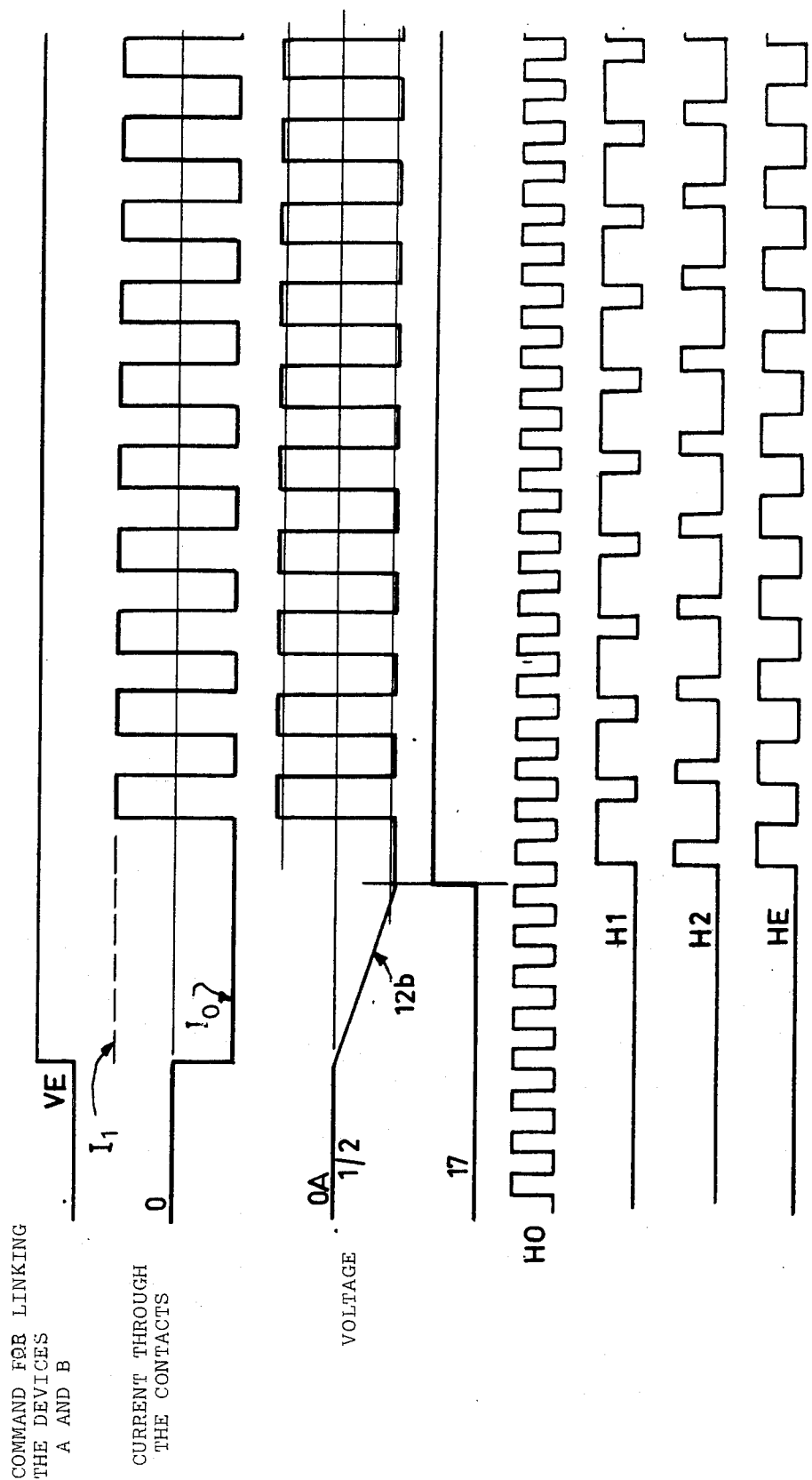

ARRANGEMENT FOR PROVIDING A POWER SUPPLY AND TRANSMITTING ELECTRICAL SIGNS BETWEEN TWO DEVICES USING A SMALL NUMBER OF CONTACTS

BACKGROUND OF THE INVENTION

The present invention relates to a system for transmitting electrical signals between two devices which are connected by a set of contacts which both allow various signals to be transmitted in one or the other direction and allow electrical energy to be supplied to one of the devices from the other.

In a commonly-assigned copending U.S. patent application Ser. No. 920,690, filed June 30, 1978, by Georges M. Giraud, now U.S. Pat. No. 4,217,572, and entitled ARRANGEMENTS FOR TRANSMITTING ELECTRICAL SIGNALS BETWEEN TWO DEVICES WHICH ARE CONNECTED BY CONTACTS, there is described an arrangement which enables various electrical signals, namely data signals, data read-out signals and synchronizing clock signals, to be transferred by means of only two contacts.

When the system described in the above Giraud U.S. Pat. No. 4,217,572 is applied to a system for keeping account of predetermined homogeneous units using an article such as a credit card carrying information, and external means for imprinting and/or operating on the said information, of the kind described in French patent application No. 77 09822 which was filed in France by the present applicants on Mar. 31, 1977, and in corresponding commonly-assigned U.S. application Ser. No. 889,517, filed Mar. 23, 1978, by Giraud et al, and entitled A SYSTEM FOR KEEPING ACCOUNT OF PREDETERMINED HOMOGENEOUS UNITS, one of the two devices concerned is formed by the article and is supplied with electrical energy at two different voltages, one of which, termed V1, is intended to power the logic circuits and the other of which, termed V2, is intended for programming the memory of the device. While the transfer of the various electrical signals between the two devices takes place via only two contacts, it is necessary to provide two other contacts separate from the first two to supply the voltages V1 and V2 to the information carrying article.

Accordingly, it is an object of the present invention to reduce to two the number of contacts which make the connection between the two devices, these two contacts enabling both the various electrical signals to be transmitted in either direction and electrical energy to be supplied to one of the devices, in the present case the article, from the other device.

SUMMARY OF THE INVENTION

It is a more particular object of the invention to improve an arrangement for supplying power and transmitting electrical signals between a first (or transmitter) device and a second (or receiver) device by means of contacts. The arrangement is capable of both allowing digital data and synchronizing and control signals to be exchanged between the two devices, and a least one supply voltage to be fed from the first (transmitter) device to the second (receiver) device. The data signals in the transmitter to receiver direction are produced by modulating the duration of two currents of different intensities which are generated in the transmitter device, and the data signals in the receiver to transmitter direction are produced by modulating the amplitude of the signal conveyed through the contacts. The duration of the pulses of current are controlled by the synchronizing signal.

Briefly stated and in accordance with the invention, the improved arrangement includes, in addition to a so-called return contact, a single contact which makes the electrical connections. The receiver device has at least one network which provides the supply voltage and which is connected via a unidirectional conduction member to the two contacts mentioned.

BRIEF DESCRIPTION OF THE DRAWINGS

The invention will now be described in detail with reference to the accompanying Figures, in which:

FIG. 6 is a logic diagram of the circuits of device B which are intended to receive and transmit the data signals;

FIG. 8 shows various control signals from device A;

DETAILED DESCRIPTION OF THE PREFERRED EMBODIMENTS

Figure 1:
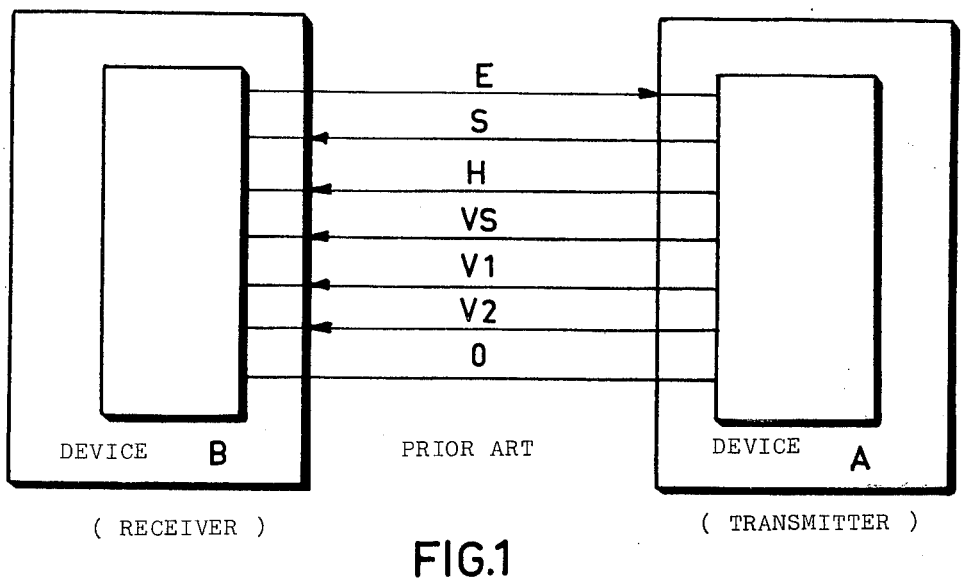
FIG. 1 is a diagram of a prior art arrangement including two devices connected by contacts which allow a number of transmissions to be made from one device to the other.

FIG. 1 is a diagrammatic view of a prior art arrangement including two devices A and B which temporarily are connected by contacts which allow electrical data signals to be transferred between the devices A and B, and electrical energy to be supplied from device A to device B.

The present invention relates particularly, although not exclusively, to the exchange of digital data by the transmission of pulses from one circuit to another, one of the circuits being formed by a fixed or transmitter device (device A) and the other by a portable member or receiver device (device B) which is provided with contacts which cooperate for the whole period of transmission with suitable electrical contacts with which the fixed device A is equipped.

In general, and with continued reference to FIG. 1, in an application of this nature, a data carrying signal S has to be transmitted from device A to device B, a data carrying signal E has to be transmitted from device B to device A, and a synchronizing clock signal H has to be transmitted from device A to device B to allow the exchanged data to be processed in synchronization in each of the two devices.

In addition, it is necessary for device A to supply device B with a control signal VS and two electrical supply voltages of which one, V1, is intended to power the logic circuits of device B and the other, V2, is intended for programming the memory included in device B. Finally, it is necessary for a return connection 0 to be provided.

The Giraud et al U.S. patent application Ser. No. 889,517 mentioned above describes an application of this nature in which five contacts are provided to make the various connectons listed above, namely one contact for the clock signals, one contact for the data signals (in either direction) and control signals, two contacts for the two voltages V1 and V2, and one return contact.

In the above-mentioned Giraud U.S. Pat. No. 4,217,572, there is disclosed, in the context of an application to the system which forms the subject of the above-mentioned Giraud et al U.S. patent application Ser. No. 889,517, means for reducing to a minimum the contacts intended to allow the various data and control signals to be transmitted between the two devices concerned.

The present invention reduces still further the number of separate contacts between two devices of the above kind. Specifically, the number of contacts is reduced to the minimum number of two. A single contact and one "return" contact allow not only the transfer of the various signals, but also the supplying of the two voltages.

Figure 2:
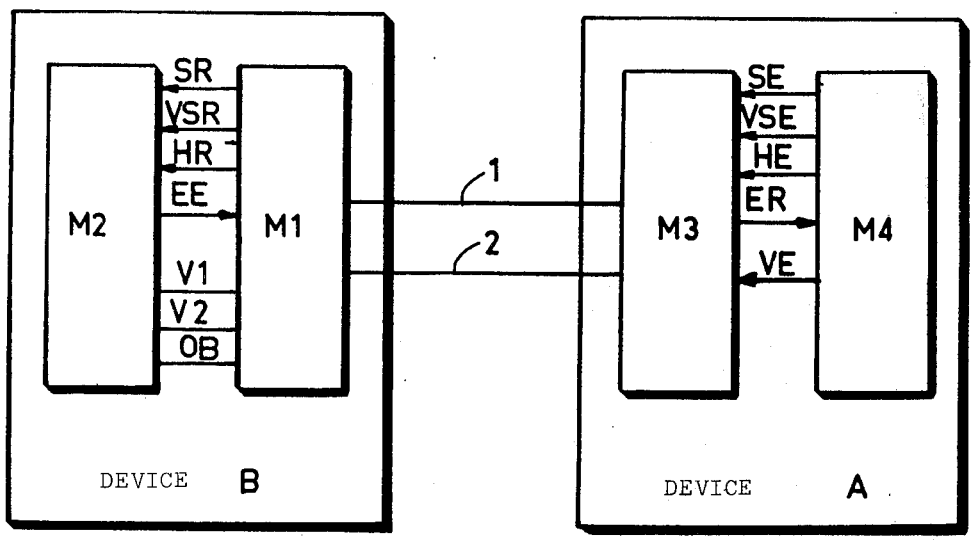
FIG. 2 is a diagram of an arrangement according to the invention which performs the same functions as those performed between the two devices of FIG. 1.

FIG. 2 shows a system according to the invention in very diagrammatic form. In FIG. 2, device B includes a circuit M1 for generating and transmitting signals and voltages, and a circuit M2 for making use of them. Circuit M2 receives from circuit M1 a signal SR, which is the reception signal from the signal S transmitted by device A, a signal VSR which is the reception signal from the control signal VS transmitted by device A, and the two voltages V1 and V2.

Device A contains a signal transmitting and generating circuit M3 and a user and control circuit M4. Circuit M3 receives from circuit M4 a signal SE which is the transmission signal for signal S, a signal VSE which is the transmission signal for the control signal VS, and a signal HE which is the transmission signal for the clock signal H. Finally, circuit M3 transmits to circuit M4 a signal ER which is the reception signal from the signal E coming from device B.

Circuit M1 is connected to circuit M3 by two contacts inserted in lines 1 and 2. In the particular application envisioned, it is contemplated that the contacts are temporary.

Figure 3:
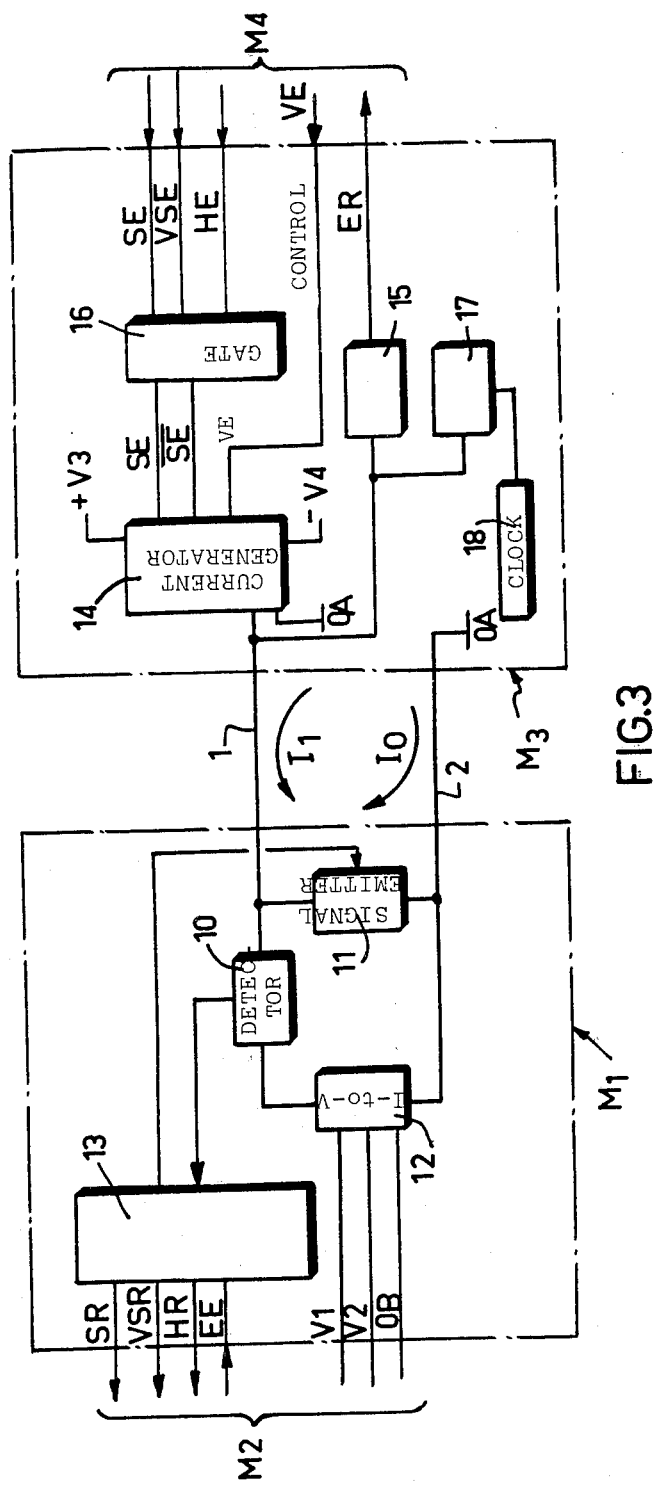
FIG. 3 is a logic diagram of a portion of an embodiment of the arrangement of FIG. 2.

FIG. 3 is a logic diagram of an embodiment of the circuits M1 and M3 of the arrangement of FIG. 2. Circuit M3 includes a current generator 14 which transmits current signals. Suitable circuitry for the current generator 14 is described in greater detail as "converting means M1" in a commonly-assigned U.S. patent application Ser. No. 875,564, filed Feb. 6, 1978, by Georges M. Giraud, now U.S. Pat. No. 4,163,210, and entitled, ARRANGEMENT FOR CHECKING A CONTACT INSERTED BETWEEN A TRANSMITTER CIRCUIT AND A RECEIVER CIRCUIT TO ALLOW ELECTRICAL SIGNALS TO BE TRANSMITTED, the entire disclosure of which is hereby incorporated by reference.

More particularly, current generator 14 is capable of generating either of two currents $I_0$ and $I_1$ having directions indicated by arrows in FIG. 3 along the lines 1 and 2. Positive and negative supply voltages for the generator 14 are designated $+V3$ and $-V4$.

Current generator 14 receives a control signal VE for a connection between the two devices A and B, and two signals SE and SE which come from a gate element 16 which receives the signals SE, VSE and HE from circuit M4.

To detect the signals emitted by gate element 16, a detector 10 is included in circuit M1. The currents $I_0$ and $I_1$ flow through member 10.

An I-to-V convertor 12 connected to detector 10 converts the currents $I_0$ and $I_1$ into voltages V1 and V2 for supplying the circuitry of device B.

A signal emitter 11 connected to the two lines 1 and 2 emits signals from circuit M2 intended for circuit M4. To this end, emitter 11 is connected to a circuit 13 which receives a signal EE and which transmits the signals SR, VSR and HR to circuit M2.

In circuit M3, an element 15 connected to line 1 produces the signal ER intended for circuit M4 and a element 17, likewise connected to line 1, controls a clock signal generator 18.

Figure 4:
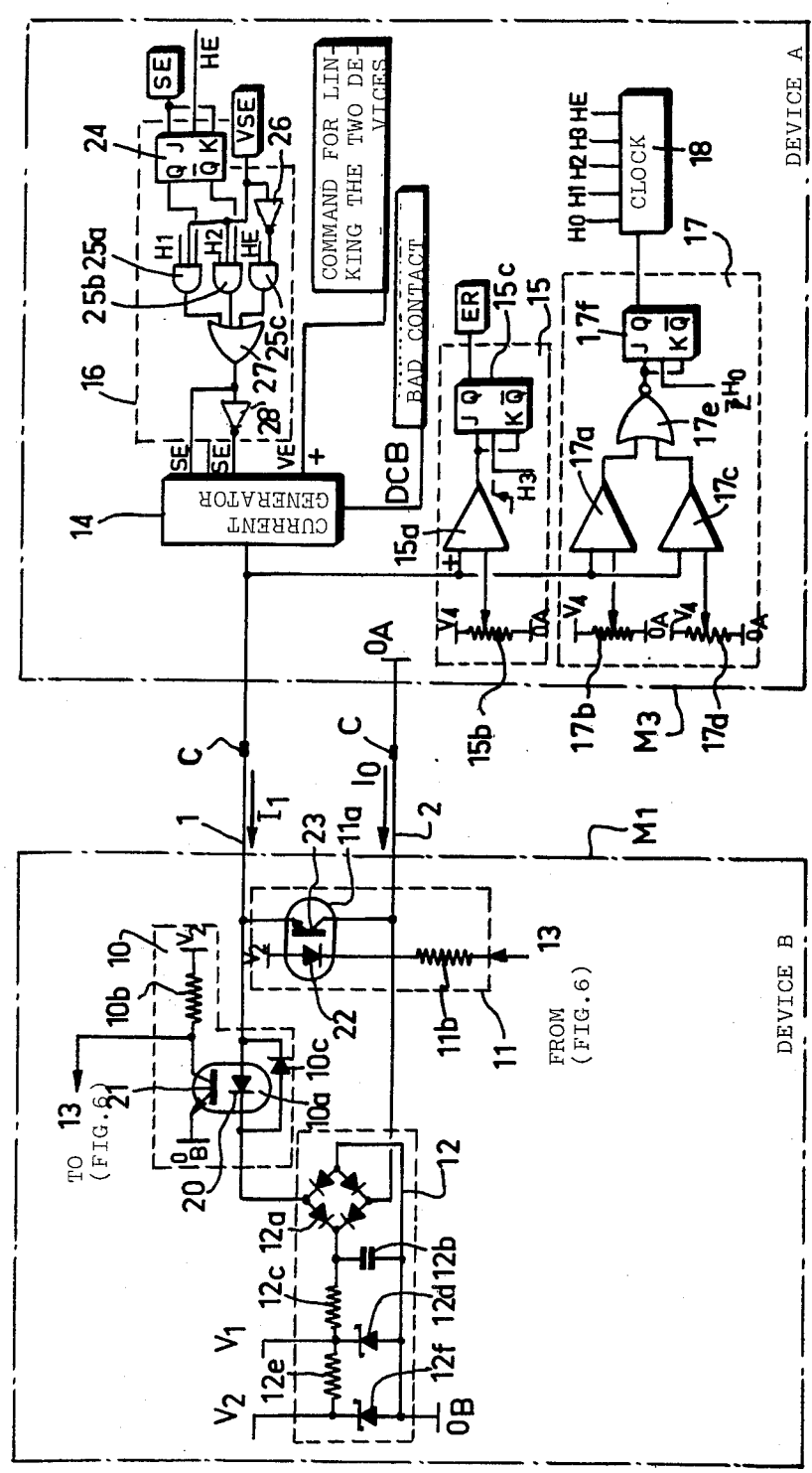
FIG. 4 is a more detailed view of the arrangement of FIG. 2.

Reference will now be made to FIG. 4, which shows the structure of detector 10, signal emitter 11, I-to-V converter 12, gate 16, and elements 15 and 17 in detail. In FIG. 4, the contacts which connect devices A and B are indicated symbolically by the letter C.

Considering first circuit M1 of Device B, detector 10 includes a photo-coupler 10a which comprises a light-emitting diode 20 inserted in line 1 and a photo-sensitive transistor 21 biased by voltage V2 through a collector load resistor 10b. The voltage at the collector of transistor 21 is fed to element 13, described hereinafter with particular reference to FIG. 6. To shunt the current $I_0$, a diode 10c is connected in parallel with the photo-coupler 10a.

Signal emitter 11 contains a photo-coupler 11a which comprises a light-emitting diode 22 fed by voltage V2 connected to the diode anode, a resistor 11b connected between the diode cathode and element 13, and a photo-sensitive transistor 23 connected directly across lines 1 and 2.

The I-to-V converter 12 includes a diode bridge rectifier 12a having its AC input terminals connected to the lines 1 and 2. A smoothing capacitor 12b is connected across the DC output terminals of the bridge rectifier 12a. To provide the voltages V1 and V2, Zener diodes 12d and 12f are supplied from the bridge rectifier DC output terminals through resistors 12c and 12e. Alternatively stated, the voltages V1 and V2 are provided by networks comprising the resistor 12c and Zener diode 12d, and the resistor 12e and Zener diode 12f, respectively. The voltages V1 and V2 are referenced to $0_B$, the zero reference of device B.

Considering next circuit M3 of Device A in FIG. 4, element 15 includes a comparator in the form of a differential amplifier 15a, which has a threshold adjusting potentiometer 15b connected between V4 (a steady voltage) and $0_A$ the zero reference of device A. The element 15 also includes a bistable flip-flop 15c which is controlled by clock signal H3 and emits the signal ER intended for circuit M4.

Element 17 contains two comparators in the form of differential amplifiers 17a and 17c whose threshold adjusting potentiometers 17b and 17d are connected between V4 (steady voltage) and the zero reference voltage $0_A$. The outputs of comparators 17a and 17c are connected to a NOR gate 17e which is connected to a bistable flip-flop 17f controlling the clock generator 18.

The clock generator 18 produces the various clock signals H0, H1, H2, H3 and HE employed in the circuit.

The gate element 16 includes a bistable flip-flop 24 controlled by clock signal HE. The Q output of flip-flop 24 is connected to an input of an AND gate 25a, and the $\bar{Q}$ output is connected to an input of a second AND gate 25b. AND gate 25a also receives the clock signal H1 and the control (validating) signal VSE. AND gate 25b also receives the clock signal H2 and signal VSE. Signal VSE is also applied, via an inverter 26, to an AND gate 25c which also receives clock signal HE.

The three AND gates 25a, 25b, 25c are connected to an OR gate 27 which is connected to the current generator 14 both directly (signal SE) and via an inverter 28 (signal $\overline{SE}$).

Finally, the current generator 14 is capable of emitting a logic signal DCB which informs the system whether device B has satisfactorily received the signals emitted by device A.

Element 13, which is shown diagrammatically in FIG. 3, will now be described in detail with reference to FIG. 6. Element 13 contains a shaping device 13a which is connected to a monostable 13c of period ta which emits the signal HR, to a monostable 13b of period tc, and to a bistable flip-flop 13e which provides signal SR.

Monostable 13c is connected to a monostable 13d of period tb, which in turn is connected to flip-flop 13e and to a monostable 13f of period td via an AND gate 13g. Monostable 13b is also connected to AND gate 13g. The Q output of monostable 13f validates the signal EE to be transmitted by means of an open-collector NAND gate 13h.

The operation of the arrangement described above is as follows:

The arrangement functions to transmit the data signal S, the control signal VS and the clock signal H from device A to device B, and to supply the circuits of device B with the voltages V1 and V2. It also transmits the data signal E from device B to device A. All these functions are performed through the channel formed by the two contacts C in the two lines 1 and 2.

The transmission of signals S, VS and H from device A to device B takes place in exactly the same way as in the arrangement described in the above-mentioned Giraud application Ser. No. 920,690, now U.S. Pat. No. 4,217,572 the entire disclosure of which is hereby incorporated by reference.

In device A, the current generator 14 is responsible for the transmission SE of signal S, the transmission VSE of control signal VS, and the transmission HE of clock signal H. Element 15 is responsible for the reception ER of the signal E from device B.

In device B, element 13 deals with the reception SR of signal S, the reception HR of the clock signal H, and the reception VSR of the control signal VS. Signal emitter 11 deals with the transmission EE of signal E.

Figure 7:
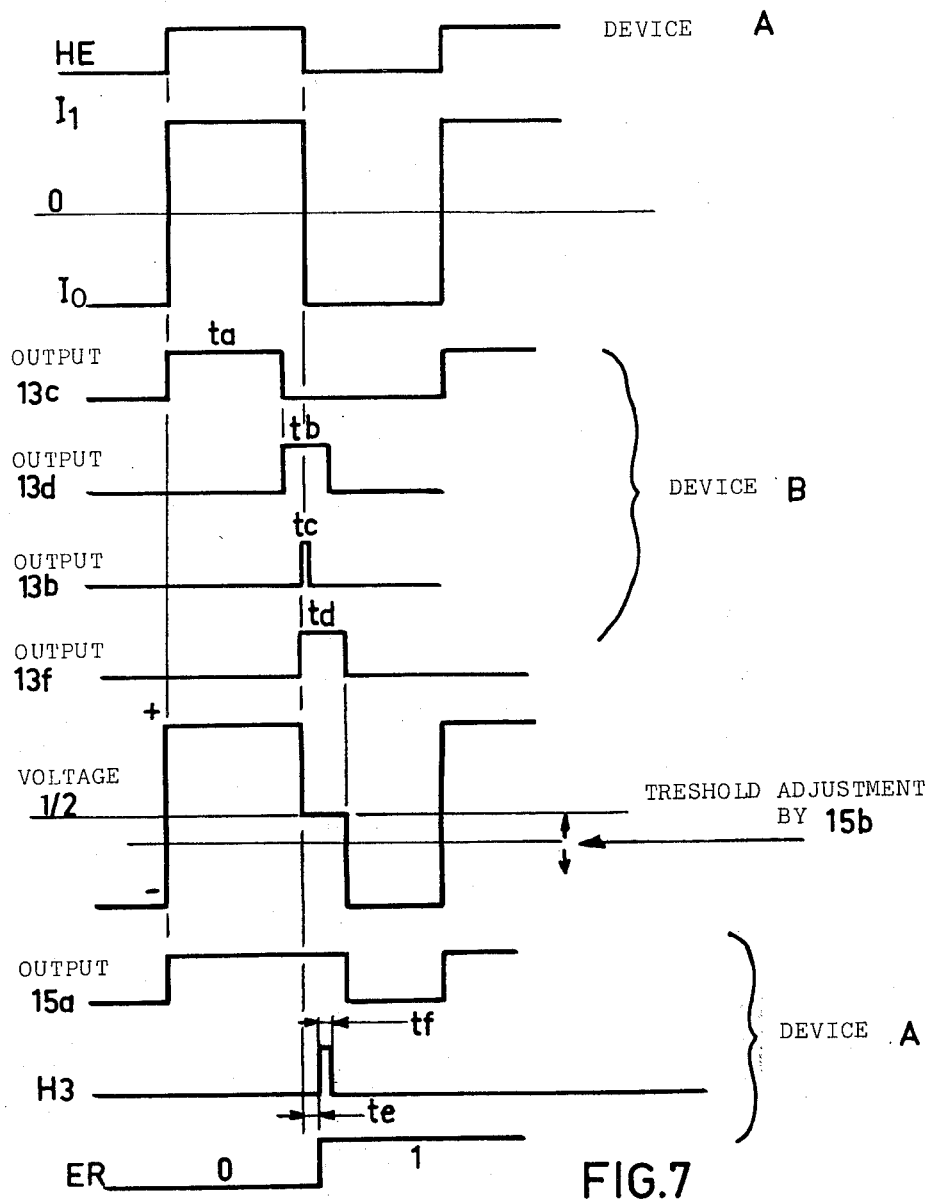
FIG. 7 shows various signals generated in the circuits of devices A and B.

Current generator 14, which is similar to element 20 of the arrangement in FIG. 7 of the Giraud U.S. Pat. No. 4,217,572, contains a first current generator which generates current $I_0$ and a second current generator which generates current $I_1$.

In device B the currents $I_0$ and $I_1$ are demodulated to obtain the signal HR (clock signal at reception) and the signal SR (signal S at reception).

When device A is to transmit a signal S intended for device B, a command signal VE (FIG. 8) for a linking of devices A and B is fed to current generaor 14, which transmits a current $I_0$ to device B.

The capacitor 12b in I-to-V converter 12 charges, the voltage at its terminals being monitored by the element 17 which triggers the generator 18 which supplies the various clock signals (H1, H2, H3 and HE) from the basic clock signal H0.

Figure 9:
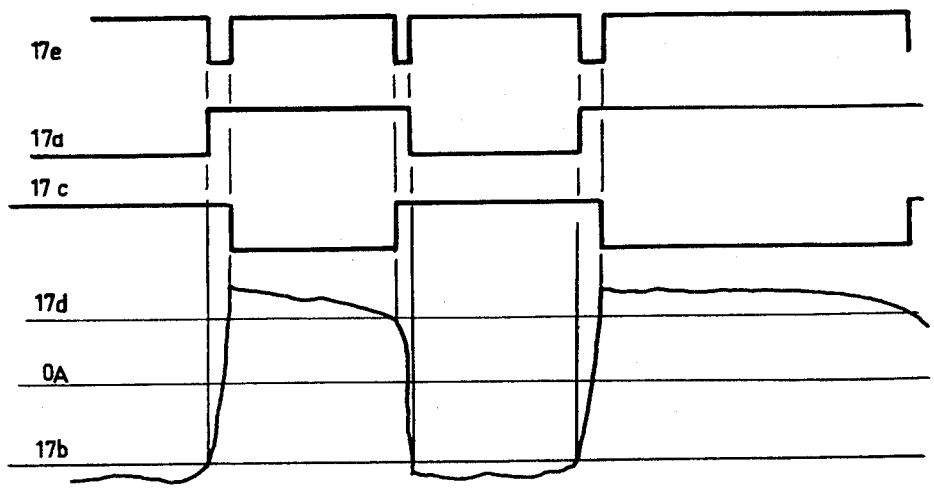
FIG. 9 shows various signals from the control circuit for the clock signal generator of device A.

FIG. 9 shows the various output signals from components 17b, 17c, 17d and 17e of element 17.

The transmission of signal S is validated by the signal VSE applied to AND gates 25a, 25b and 26c.

When a rising edge of clock signal HE appears, flip-flop 24 receives the bit to be transmitted. Current generator 14 duration modulates the pulses of currents $I_0$ and $I_1$ with the object of transmitting binary 0 and 1 states.

This modulation process is described in detail in the Giraud U.S. Pat. No. 4,217,572, which was incorporated by reference above. The element 13 shown in FIG. 6 which handles the reception of signals S and VS and the transmission of signal E is identical to the circuit B shown in FIG. 7 of the Giraud application U.S. Pat. No. 4,217,572 and operates in the same way.

Flip-flop 13e emits the signal SR, which is identical to signal SE but displaced in time. Whether or not the state of this flip-flop is accepted by the user circuit M2 depends on the state of the signal VSR emitted by the monostable 13f which notifies the direction of transfer.

If the pulse of length tc emitted by monostable 13b, which appears at the decaying edge of the signal from device A and which changes from $I_1$ to $I_0$, occurs outside the period of the pulse tb from monostable 13d, then the signal emitted by device A is a signal S (with S=0 or S=1). Flip-flop 13f emits from its $\bar{Q}$ output the signal (VSR) for validating the reception of signal S.

If the signal of length tc occurs (FIG. 7) within the period tb, this means a signal $I_0$, $I_1$ whose period is equal to that of signal HE. This special modulation of the currents $I_0$, $I_1$ is controlled by signal VSE and produces a signal which is fed by device A to device B to notify the latter that it is to transmit the signal E intended for device A.

Figure 5:
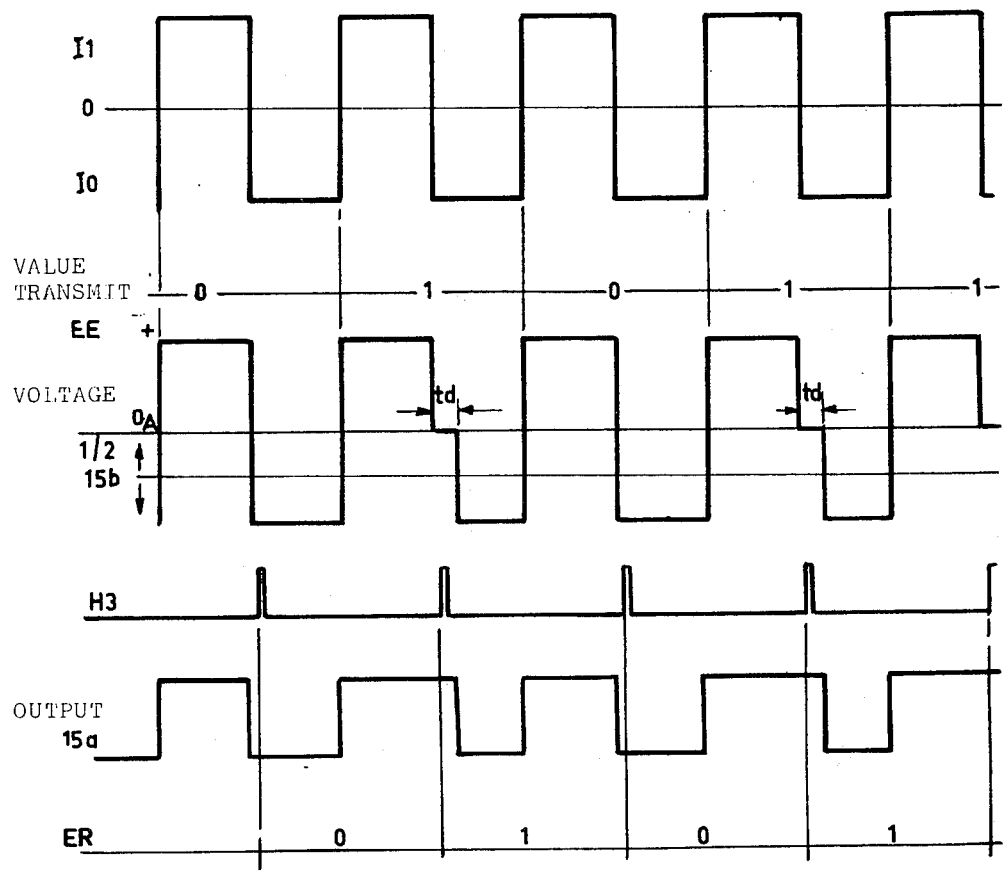
FIG. 5 is a timing diagram of the data signals transmitted from device B to device A.

FIGS. 5 and 7 illustrate the transmission of signal E, which is considerably different from that which takes place in the arrangement which is the subject of the above-mentioned Giraud U.S. Pat. No. 4,217,572, since the modulation performed is of the voltage between lines 1 and 2 rather than of the amplitude of a current generated in the receiver device.

In fact, depending on whether the signal EE to be transmitted is 1 or 0, NAND gate 13h either does or does not apply to signal emitter 11 the signal of length td which appears at the Q output of flip-flop 13f.

FIG. 7 illustrates the case where the signal EE to be transmitted is 1. In this case, the signal of length td is applied to emitter 11, which, by means of transistor 23, shunts the current $I_0$. The voltage between lines 1 and 2 becomes nearly zero for the length of time td. Because of the negative threshold set by potentiometer 15b, the output of comparator 15a is held high and when the clock signal H3 appears flip-flop 15c changes to the 1 state.

In the case where signal EE is 0 (FIG. 5), no signal is transmitted by member 13h and the modulation $I_0$ and $I_1$ is not interfered with. As a result, coincidence no longer occurs between the appearance of clock signal H3 and the high state of the output of 15a, and flip-flop 15c goes to the 0 state.

It should be noted that when a signal EE=1 is emitted, then current $I_0$ is shunted by photo-transistor 23 for a period td and thus does not feed the I-to-V converter 12. It is therefore necessary for this period td to be as short as possible.

The function of the I-to-V converter 12 is to supply device B with the two voltages V1 and V2 by rectifying the alternating signals $I_0$ and $I_1$ conveyed along lines 1 and 2.

These currents $I_0$ and $I_1$ are present at all times on lines 1 and 2, except during the very short intervals td, whether what is involved is transmission of a signal SD from A to B or transmission of a signal E from B to A.

The continued presence of the voltages V1 and V2 is ensured by the smoothing capacitor 12b at the output of rectifier bridge 12a.

Figure 10:
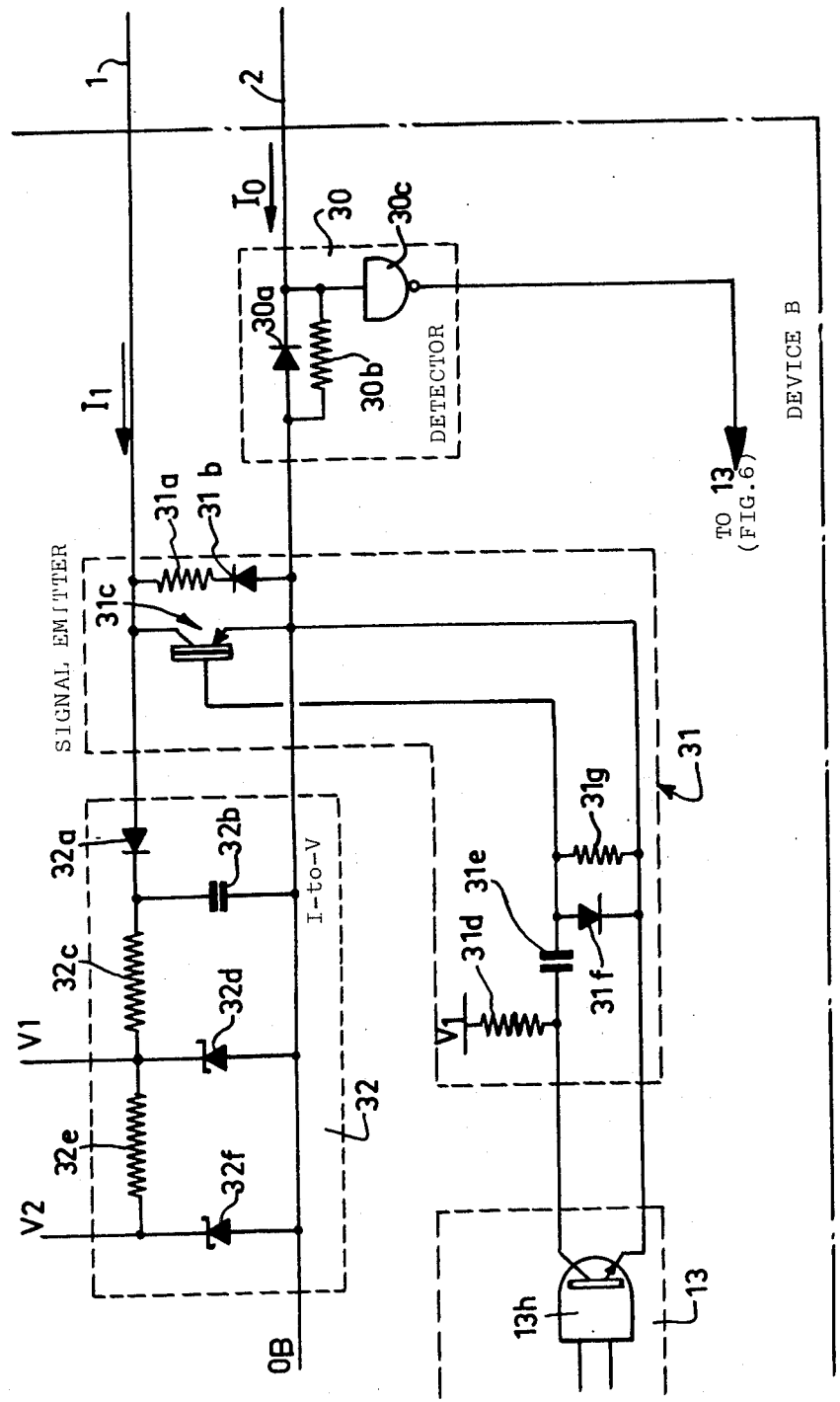
FIG. 10 shows the electrical diagram of a modified embodiment of device B.

FIG. 10 shows a modified embodiment of detector 10, emitter 11, and I-to-V converter 12 of device B of FIG. 4. In FIG. 10, elements 30, 31 and 32 perform the same functions as elements 10, 11 and 12, respectively.

The current $I_1$ flows through a diode 32a and a capacitor 32b of I-to-V converter 32, and through a diode 30a of detector 30.

Current $I_0$ flows through a resistor 30b of detector 30, then through a diode 31b and a resistor 31a, or a transistor 31c, of emitter 31.

When member 13h is not saturated, a capacitor 31e charges through a resistor 31d and a diode 31f. When the signal of length td appears, member 13h is saturated and capacitor 31e discharges through the emitter/base junction of the transistor 31c, which saturates and shunts the current $I_0$, causing a voltage drop between lines 1 and 2 which will be detected in device A by member 15.

I-to-V converter 32 provides the voltages V1 and V2 by means of networks comprising a resistor 32c and a Zener diode 32d, and a resistor 32e and a Zener diode 32f, respectively. Since I-to-V converter 32 has only the half-wave rectifier diode 32a, the converter 32 accepts only the current $I_1$ and, during the periods when current $I_0$ appears, the buffer capacitor 32b ensures that there is no interruption voltages V1 and V2.

The invention is not, of course, limited to the embodiments illustrated and described above and, in fact, covers all modifications thereof will occur to those skilled in the art. It is therefore to be understood that the appended claims are intended to cover all such modifications and changes as fall within the true spirit and scope of the invention.

What is claimed is:

1. An arrangement for providing a power supply and transmitting data signals between first and second devices by means of a pair of contacts, which arrangement is capable of allowing digital data signals to be exchanged between said devices and at least one operating voltage to be fed from said first device to said second device, said arrangement comprising:
   a modulated current generator in the first device connected to the contacts for transmitting the data signals from the first to the second device by modulating the duration of two currents of different intensities, the contacts thereby conveying an electrical signal;
   an amplitude modulator in the second device for transmitting data signals from the second device to the first device by modulating the amplitude of the electrical signal conveyed by the contacts; and
   a network in the second device for producing operating voltage in the second device, said network being connected via a unidirectional current conduction member to the contacts.

2. An arrangement according to claim 1, wherein said network comprises a resistor and a Zener diode in series and a smoothing capacitor interposed between said network and said unidirectional current conduction member.

3. An arrangement according to claim 2, wherein said unidirectional current conduction member comprises a bridge rectifier.

4. An arrangement according to claim 2, wherein said unidirectional current conduction member is a diode.

5. An arrangement according to claim 1, wherein the amplitude modulation by said second device is performed by an element for shunting the two contacts, said shunting element modulating the voltage between the two contacts to one of two values depending on whether an item of data to be transmitted is a 1 bit or an 0 bit, and wherein said first device includes a circuit for detecting the modulation.

6. An arrangement according to claim 5, wherein said detecting circuit of said first device comprises a voltage comparator.

7. An arrangement according to either claim 5 or 6, wherein said short circuiting element comprises a transistor.

8. An arrangement according to claim 7, wherein said transistor short-circuiting element is the output portion of a photo-coupler.

9. An arrangement according to claim 7, wherein said second device includes a photo-coupler for detecting the signals transmitted by said first device.

10. An arrangement for both transmitting data signals between first and second devices and supplying operating voltage from the first to the second device through a single pair of contacts, said arrangement comprising:
    a modulated electrical signal generator in the first device connected to the pair of contacts for transmitting data signals from the first device to the second device and producing a voltage across the contacts, the contacts thereby conveying an electrical signal;
    an amplitude modulator in the second device connected to the pair of contacts for transmitting data signals from the second device to the first device by modulating the amplitude of the electrical signal conveyed by the contacts; and
    a network in the second device for producing operating voltage in the second device, said network being connected to the contacts via at least one unidirectional current conduction member.

11. An arrangement according to claim 10, wherein the second device is a portable article such as a credit card, and the first device is a fixed terminal.

12. An arrangement according to claim 10, wherein said modulated electrical signal generator comprises a current generator.

13. An arrangement according to claim 12, wherein said amplitude modulator modulates the amplitude of a voltage across the contacts.

14. An arrangement according to claim 10, wherein said amplitude modulator modulates the amplitude of a voltage across the contacts.

15. An arrangement according to claim 13, wherein said amplitude modulator comprises an element for shunting the contacts, said shunting element modulating the voltage between the contacts to one of two values depending on whether an item of data to be transmitted is a binary "1" or a binary "0" bit, and wherein said first device includes a circuit for detecting the modulation.

16. An arrangement according to claim 15, wherein said detecting circuit of said first device comprises a voltage comparator.

17. An arrangement according to claim 10, wherein said amplitude modulator comprises an element for shunting the contacts, said shunting element modulating the electrical signal conveyed by the contacts to one of two values depending on whether an item of data to be transmitted is a binary "1" bit or a binary "0" bit, and wherein said first device includes a circuit for detecting the modulation.

18. An arrangement according to claim 10, wherein said network comprises a resistor and a Zener diode in series and a smoothing capacitor interposed between said network and said unidirectional current conduction member.

19. An arrangement according to claim 18, wherein said unidirectional current conduction member comprises a bridge rectifier.

20. An arrangement for both transmitting data signals between a fixed terminal and a portable article such as a credit card and supplying an operating voltage from the fixed terminal to the portable article through a single pair of contacts, said arrangement comprising:
- a modulated electrical signal generator in the fixed terminal connected to the pair of contacts for transmitting data signals from the fixed terminal to the portable article and producing a voltage across the contacts, the contacts thereby conveying an electrical signal;
- an amplitude modulator in the portable article device connected to the pair of contacts for transmitting data signals from the portable article to the fixed terminal by modulating the amplitude of the electrical signal conveyed by the contacts; and
- a network in the portable article for producing operating voltage in the second device, said network being connected to the contacts via at least one unidirectional current conduction member.

* * * * *